United States Patent

[11] 3,615,206

[72] Inventors Charles E. Fogle
Sunnyvale;
Robert T. Rewick, Mountain View, both of Calif.
[21] Appl. No. 457,901
[22] Filed Apr. 28, 1965
[45] Patented Oct. 26, 1971
[73] Assignee United Aircraft Corporation
East Hartford, Conn.

[54] PROCESS OF PREPARING BROMINE HEPTAFLUORIDE
9 Claims, 2 Drawing Figs.

[52] U.S. Cl....................................................... 23/205,
149/1, 149/36
[51] Int. Cl....................................................... C06b 7/24
[50] Field of Search............................................ 23/205

[56] References Cited
OTHER REFERENCES

Schumb et al., Industr. Engng. Chem., Vol 42, (1950) pp. 1383 to 1386 TP 1A58.

Emeleus et al., Advances in Inorganic Chemistry and Radiology, Vol. 3, 1961, p. 139, Qd 1A35.

*Primary Examiner*—Leland A. Sebastian
*Attorney*—Steven F. Stone

CLAIM: 1. A process for the preparation of bromine heptafluoride comprising the steps of reacting bromine pentafluoride with fluorine in the presence of a compound having the formula $MBrF_6$, wherein M is an alkali metal, at a temperature of from about 110° C. to about 340° C. and separating bromine heptafluoride from the unreacted reactants and other reaction products.

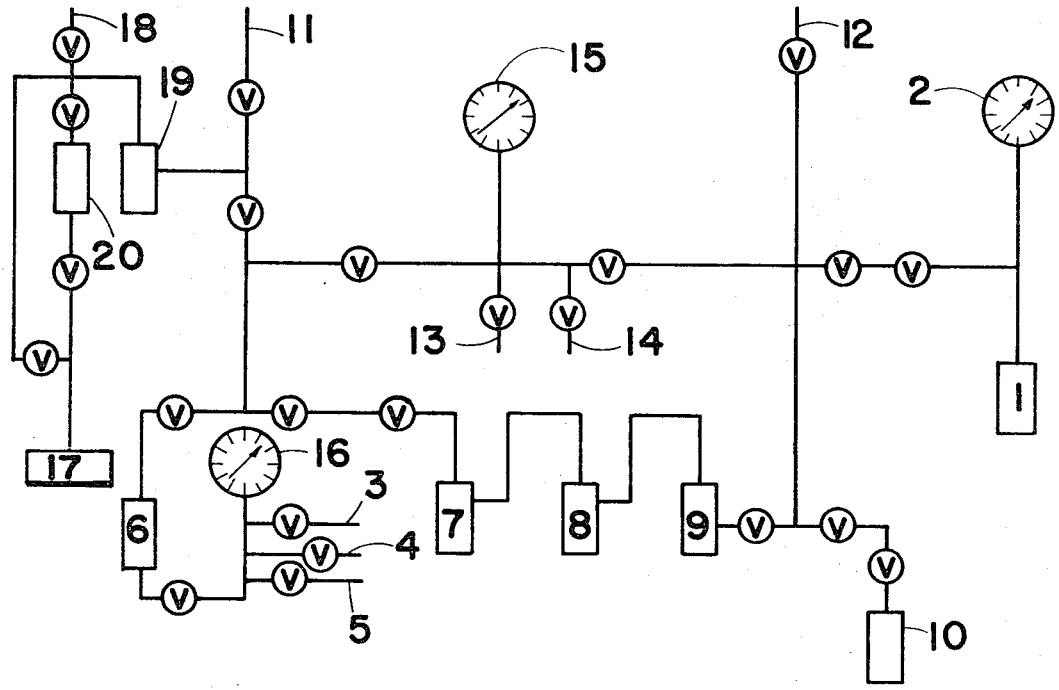
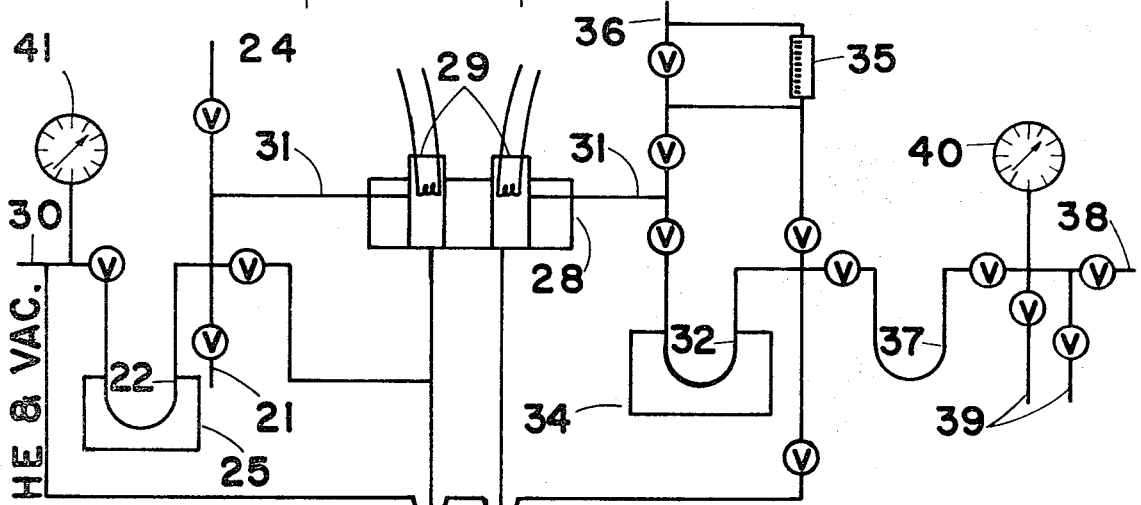

PROCESS OF PREPARING BROMINE HEPTAFLUORIDE

This invention relates to complex fluorides and more particularly to bromine heptafluoride and methods for production thereof.

Bromine heptafluoride ($BrF_7$) is a very reactive oxidizing agent, has a density comparable to that of bromine pentafluoride and has a fluorine content and bond energies equivalent to chlorine trifluoride. Although a gas at room temperature, it is readily condensable to a storable liquid. When used as the oxidizer in a liquid fueled bipropellant system using hydrazine as a fuel, a theoretical density impulse of 500 sec. is realized. This represents an increase in performance of about 40 percent over state of the art bipropellant systems such as LOX-Kerosene, and an improvement of about 10 percent over the most advanced systems now known.

However, prior to this invention of $BrF_7$ and the method for preparing it, the compound itself was unknown and was considered to be incapable of synthesis. As was stated in The Journal of the American Rocket Society, Vol. 29, No. 2, in an article entitled "Recent Advances in Fluorine Chemistry and Technology" under the subhead "Halogen Fluorides and Complex Fluorides:" "Since 1931, when bromine pentafluoride was first prepared 35, no new halogen fluorides have been found, and one of these previously accepted, bromine monofluoride, can probably not be isolated 36. It would be an achievement to prepare, for example, $ClF_5$ or $BrF_7$; however, stereo chemistry suggests that these will not be made."

Support for this position appears in the fact that the only known halogen heptahalide is iodine heptafluoride (See Comprehensive Inorganic Chemistry, Vol. 3, Sneed et al., Van Nostrand (1957) P. 231.

Contrary to the teachings of the prior art, we have developed a method for preparing $BrF_7$ and have isolated the compound.

Accordingly, the primary object of this invention is the new compound, bromine heptafluoride.

Another object of this invention is a method for preparing, recovering and purifying bromine heptafluoride. These and other objects of the invention will be readily apparent from the following description with reference to the drawings wherein:

FIG. 1 is a schematic representation of the apparatus used to form $BrF_7$, and

FIG. 2 is a schematic representation of the apparatus used to purify $BrF_7$.

The reaction route is basically a fluorine addition reaction to $BrF_5$ according to the equation:

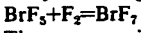

$$BrF_5 + F_2 = BrF_7$$

The presence in the reaction mixture of $MBrF_6$ where M is Cs or K appears to facilitate the formation of $BrF_7$ according to the following equation:

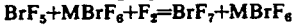

$$BrF_5 + MBrF_6 + F_2 = BrF_7 + MBrF_6$$

The $MBrF_6$ may be added separately to the reaction mixture, but, preferably, it is formed in situ by adding MF to the reactants containing an excess of $BrF_5$. The process may be practiced both on a static or a flow basis. The yields are relatively low, making the recovery of the product from the reactants fairly difficult.

It has been found that relatively pure $BrF_7$ can be recovered by condensation by passing the crude reactants through a series of cold traps cooled to −80° C. and −183° C. The semirefined condensate or crude is then purified by fractionation in a fractional codistillation apparatus.

Apparatus suitable for the synthesis of $BrF_7$ is shown in FIG. 1. The reactor 1 consisted of a nickel cylinder 6 in. in length by 1⅞ in. in diameter with a capacity of 180 ml. to which was attached a pressure gauge 2 having a monel bourdon tube. Nitrogen, fluorine and bromine pentafluoride feed lines 3, 4 and 5 respectively are connected to a NaF scrubber 6 which in turn is connected through suitable valving V to vent line 11, cold trap 19 and soda-lime scrubber 20. In a typical run in which $CsBrF_6$ is formed in situ from CsF and $BrF_5$, 99.52 percent pure CsF with traces of other alkali metal fluorides is charged into the reactor 1 which is evacuated by pump 17 and the CsF dried at 150° C. for 16 hours. The system is returned to ambient pressure with pure nitrogen from cold trap 19. $BrF_5$ with a minimum purity of 98 percent is further purified by distillation into the reactor 1 through the NaF scrubber 6 maintained at 175° C. The fluorine, with a purity of 98+percent, is also further purified by passing it slowly through the NaF scrubber 6 and traps 7, 8 and 9, cooled with liquid oxygen, into holding tank 10. This process removes all impurities with the exception of traces of $CF_4$ and HF. A portion of the purified fluorine is then condensed into the reactor 1 by cooling with liquid nitrogen. Upon warming to room temperature, the reactor pressure increases to about 250 to 270 p.s.i. and pressures of from 500 to 4,750 p.s.i. are observed at reaction temperatures varying from 100° C. to 340° C. The reactor can be agitated during the reaction period if desired. After a predetermined reaction time which varied from 4 to 128 hours, the reactor is allowed to cool to room temperature and pressure is released slowly through the fractionation system consisting of trap 7 cooled with dry ice-acetone to a temperature of −79.8° C. and traps 8 and 9 cooled to liquid oxygen temperature of −183° C. The great majority of the condensable gas collects in trap 7 and a small amount of material condenses in traps 8 and 9. When the system reaches 1 atm, it is flushed with gaseous nitrogen and then evacuated. The infrared spectrum of each fraction is obtained by removing the fraction from the system through infrared cell inlet 14. An unidentifiable infrared absorption peak was found at 735 cm-1 which corresponds to a theoretical prediction of an absorption peak for $BrF_7$ close to 735 cm-1. The crude material showing the 735 cm-1 peak was highly contaminated and was purified by means of the fractional codistillation apparatus shown in FIG. 2.

In a typical separation, a crude sample is connected to the apparatus at inlet 21 and either frozen into transfer U-tube 22 or separation U-tube 23. If the sample is large, it is first frozen into 22 and then transferred with a flow of helium from source 24 and warming to separation U-tube 23. Dewar vessels 25 and 26 are provided around U-tubes 22 and 23 and after transfer is completed, transfer U-tube 23 is cooled to liquid nitrogen temperature and helium flow is adjusted to about 110 cc./min. Dewar vessels 25 and 26 are quickly removed, emptied and replaced around the U-tubes. The arms of U-tube 23 are connected to channels in a monel block 28 which are sealed at the upper end and contain heating elements 29. Helium fed from inlet 30, cooled by passage through U-tube 22, cools block 28 by passage through Teflon tubing 31 which surrounds block 28. This gas flow helps to maintain thermal equilibrium and is bypassed around collection U-tube 32 until a temperature of −130° C. is obtained as measured by thermocouple 33. At this time collection U-tube 32 is cooled to liquid nitrogen temperature by means of dewar vessel 34 and maintained at 1 atm pressure. At a temperature of −127° C., gas flow is directed through collection U-tube 32, flowmeter 35 and out exit line 36. When a temperature of −110° C. is reached, gas flow is again diverted around collection U-tube 32. The material in tube 32 is subsequently vacuum transferred to measuring U-tube 37 by means of vacuum line 38 and can be removed from the system through takeoff lines 38. Pressure gauges 40 and 41 are located as shown. The apparatus, with the exception of block 28 and Teflon tubing 31 was constructed of copper tubing with valve means V employed as shown. The cut delivering $BrF_7$ was determined at −127° C. to −110° C. by successive narrowing of the collection range and analysis of the material.

The above-described procedure is effective for separating small amounts of gas by carrier gas distillation whereby the vaporized sample is carried into small diameter columns, either packed or unpacked, maintained at liquid nitrogen temperatures. Because a temperature gradient exists in the cold column, the substances in the sample are fractionated and occupy zones within the column; the most volatile species being farthest from the inlet and the least volatile closest thereto. Slow warming of the column maintains a temperature gradient and each component is eluted from the column by the carrier gas in order of decreasing volatility. Flow can be directed through a thermal conductivity cell connected to a recording potentiometer whereby peaks are obtained which represent thermal conductivity differences between the effluent and pure carrier reference which are indicative of the concentrations of the individual components. Emergence of the separated substances in order of decreasing volatility also aids in identification. Also, since the initial rise of a peak is due to each component's initial vapor pressure, a correlation with melting point is possible. The specific examples of the process set forth in table I show production of crude product. When the crude products were further refined by the above fractional codistillation process, amounts of pure $BrF_7$ varying from less than 1 mg. to about 3 mg. were obtained. The pure product was analyzed on the mass spectrometer and compared with the mass spectrometer readings on $BrF_5$ as shown in table II. The differences in peak height for the ion species $BF+$ through $BrF_5+$ for $BrF_5$ and $BrF_7$ are attributed to the intrinsic difference in the bond strengths between $BrF_5$ and $BrF_7$. The presence of the peak at m/e 212 shows the presence of $BrF_7+$ derived from $BrF_7$. The presence of a peak at 193 also shows $BrF_7$ since the $BrF_6+$ ion could only be formed by the degradation of a higher interhalogen.

As noted above, table I indicates the amount of crude $BrF_7$ produced. The amount of crude, however, is not necessarily indicative of the amount of pure $BrF_7$ produced. Instead, the relative height of the 735 cm-1 infrared band provides the indication of the amount of $BrF_7$ present before purification. As noted above, the purification yielded amounts of $BrF_7$ varying from slightly below 1 mg. to 3 mg. From a consideration of the above examples, it appears that the inclusion of $CsBrF_6$ generally produced crude products having greater amounts of $BrF_7$ than reactions conducted without $CsBrF_6$.

allow the reaction of greater molar quantities of the gaseous reactants and are accordingly desirable.

Within the operating temperature range of 110° C. to 340° C., there appears to be no temperature dependence. However, above about 250° C. there appears to be some thermal decomposition of the $BrF_7$.

$BrF_7$ hydrolyzes to yield bromine, oxygen and bromic and hydrofluoric acids. It is compatible with nickel monel, copper and stainless steel in decreasing order, and is at least partially stable at temperatures as high as 250° C. At room temperature it is a gas but is readily condensable, having a boiling point of approximately 0° C.

In the above description, $CsBrF_6$ has been used as the preferred catalyst material. The process also has been conducted with $KBrF_6$. In one experiment, 6 moles of $F_2$ and 4.3 moles KF were reacted with a stoichiometric excess of $BrF_5$ of 0.11 moles at a temperature of 180° C. for 230 minutes at atmospheric pressure. A weak peak at the 735 cm-1 infrared band indicated the presence of $BrF_7$. The use of other compounds of the formula $MBrF_6$ with M being an alkali metal is contemplated herein with the higher atomic weight metals being more effective than the lower. The invention has been described with respect to specific examples thereof, however, it should not be construed as limited thereto. The invention includes all modifications and substitutions which are within the scope of the following claims.

We claim:

1. A process for the preparation of bromine heptafluoride comprising the steps of reacting bromine pentafluoride with fluorine in the presence of a compound having the formula $MBrF_6$, wherein M is an alkali metal, at a temperature of from about 110° C. to about 340° C. and separating bromine heptafluoride from the unreacted reactants and other reaction products.

2. The process of claim 1 wherein M is an alkali metal selected from the group consisting of potassium and cesium.

TABLE I

| Run number | $BrF_5$, moles | $F_2$, moles | CsF, moles | $CsBrF_6$, moles | Reaction pressure (p.s.i.) | Reaction temp. (° C.) | Reaction time (hrs.) | Weight, −183° C. fraction (g. crude $BrF_7$) | Infrared 735 cm.-1 band peak relative height |
|---|---|---|---|---|---|---|---|---|---|
| 1 | 0.198 | 0.137 | 0.177 | 0.218 | 600 | 125 | 64 | 0.131 | Medium. |
| 2 | 0.032 | 0.110 | 0.177 | 0.218 | 550 | 250 | 16 | 0.024 | Do. |
| 3 | 0.032 | 0.092 | 0.177 | 0.218 | 530 | 338 | 16 | 0.020 | Do. |
| 4 | 0.170 | 0.103 | 0.033 | 0.337 | 980 | 240 | 16 | 0.430 | Strong. |
| 5 | 0.206 | 2.450 | 0.288 | 0.480 | 4,300 | 210 | 128 | 0.281 | Do. |
| 6 | 0.218 | 2.450 | 0.288 | 0.480 | 3,500 | 150 | 87 | 0.153 | Medium. |
| 7 | 0.476 | 2.910 | 0.288 | 0.480 | 4,400 | 145 | 68 | 23.470 | Do. |
| 8 | 0.202 | 3.390 | 0.288 | 0.480 | 4,500 | 122 | 16 | 0.313 | Very strong. |
| 9 | 0.127 | 0.952 | | | 1,100 | 168 | 6 | 0.272 | Weak. |
| 10 | 0.125 | 1.996 | | | 2,050 | 183 | 4½ | 0.891 | Strong. |
| 11 | 0.110 | 2.683 | | | 2,700 | 150 | 7½ | 0.506 | Do. |
| 12 | 0.182 | 2.637 | | | 3,500 | 175 | 70 | 0.475 | Do. |
| 13 | 0.197 | 4.280 | | | 4,750 | 115 | 20 | 0.333 | Weak. |
| 14 | 0.207 | 3.860 | | | 4,650 | 140 | 64 | 3.195 | Do. |
| 15 | 0.185 | 3.390 | | | 4,550 | 175 | 16 | 10.010 | Do. |
| 16 | 0.181 | 3.050 | | | 4,300 | 210 | 68 | 0.211 | Medium. |
| 17 | 0.041 | 0.108 | | | 500 | 300 | 63 | 0.343 | Very weak. |
| 18 | 0.060 | 0.113 | | | 510 | 280 | 20 | 0.081 | Weak. |

TABLE II

| m/e | Relative Peak Height $BrF_5$ | Ion Species | Relative Peak Height $BrF_7$ |
|---|---|---|---|
| 98 | 100.0 | BrF+ | 100.0 |
| 117 | 49.2 | $BrF_2+$ | 113.0 |
| 136 | 22.3 | $BrF_3+$ | 37.2 |
| 155 | 71.3 | $BrF_4+$ | 43.2 |
| 174 | 0.5 | $BrF_5+$ | 12.0 |
| 193 | 0.0 | $BrF_6+$ | 22.8 |
| 212 | 0.0 | $BrF_7+$ | 21.0 |

An analysis of the experimental data does not indicate any clear pressure dependancy. In fact, experiments at atmospheric pressure yielded traces of $BrF_7$. However, higher pressures 3. The process of claim 2 wherein the alkali metal is cesium.

4. The process of claim 2 wherein said temperature is below 250° C.

5. The process of claim 1 wherein said temperature is below 250° C.

6. A process for producing bromine heptafluoride which comprises reacting bromine pentafluoride with fluorine, in the presence of a compound having the formula $MBrF_6$, wherein M is an alkali metal, at a temperature of from about 110° C. to 340° C., separating the unreacted reactants from the reaction products, purifying the reaction products by fractional codistillation and recovering the material eluted in the temperature range of −127° C. to −110° C.

7. The process of claim 6 wherein M is cesium.

8. The process of claim 7 wherein said temperature is below 250° C.

9. The process of claim 6 wherein said temperature is below 250° C.